(12) United States Patent
Sakurai

(10) Patent No.: US 7,215,049 B2
(45) Date of Patent: May 8, 2007

(54) GENERATOR FOR VEHICLE

(75) Inventor: Mikiya Sakurai, Ama-gun (JP)

(73) Assignee: Denso Corporation, Kariya (JP)

( * ) Notice: Subject to any disclaimer, the term of this patent is extended or adjusted under 35 U.S.C. 154(b) by 177 days.

(21) Appl. No.: 11/059,321

(22) Filed: Feb. 17, 2005

(65) Prior Publication Data

US 2005/0184526 A1   Aug. 25, 2005

(30) Foreign Application Priority Data

Feb. 20, 2004   (JP)   ............................. 2004-044396

(51) Int. Cl.
*H02K 1/32* (2006.01)
*H02K 5/18* (2006.01)
*H02K 11/00* (2006.01)
*H02K 23/52* (2006.01)
*H05K 7/20* (2006.01)

(52) U.S. Cl. .................. 310/64; 310/68 D; 290/32

(58) Field of Classification Search ............... 290/32; 361/301.3, 274.3, 514; 310/64, 68 D
See application file for complete search history.

(56) References Cited

U.S. PATENT DOCUMENTS

| | | | | |
|---|---|---|---|---|
| 3,233,164 A * | 2/1966 | Tyler | ............................. | 322/28 |
| 3,238,428 A * | 3/1966 | Kellerman | ................ | 361/274.1 |
| 3,299,303 A * | 1/1967 | Newill et al. | .................. | 310/66 |
| 3,622,846 A * | 11/1971 | Reimers | ................... | 361/274.3 |
| 3,670,210 A * | 6/1972 | Blase | ......................... | 361/514 |
| 3,721,843 A * | 3/1973 | Spisak et al. | ............. | 310/68 D |
| 3,852,628 A * | 12/1974 | Spisak et al. | ............. | 310/68 D |
| 4,309,739 A * | 1/1982 | Schmidt | ................... | 361/274.3 |
| 4,536,819 A * | 8/1985 | Deutsch | .................... | 361/274.3 |
| 5,021,927 A * | 6/1991 | Schweikert et al. | ......... | 361/514 |
| 5,673,168 A * | 9/1997 | Efford et al. | ................ | 361/518 |
| 5,686,780 A * | 11/1997 | Adachi et al. | ............. | 310/68 D |
| 5,894,402 A * | 4/1999 | Strange et al. | ............... | 361/514 |
| 5,940,264 A * | 8/1999 | Stevens et al. | ............. | 361/514 |
| 5,956,226 A * | 9/1999 | Jung et al. | .................. | 361/514 |
| 6,021,040 A * | 2/2000 | Suzuki et al. | ............... | 361/514 |
| 6,060,802 A * | 5/2000 | Masegi et al. | ............ | 310/68 D |
| 6,117,194 A * | 9/2000 | Strange et al. | .............. | 29/25.03 |
| 6,160,333 A * | 12/2000 | Chen et al. | .................... | 310/64 |
| 6,198,187 B1* | 3/2001 | Asao et al. | ................. | 310/68 D |
| 6,236,557 B1 | 5/2001 | Kashihara et al. | ........ | 361/301.3 |
| 6,304,012 B1* | 10/2001 | Chen et al. | .................... | 310/58 |
| 6,426,575 B1* | 7/2002 | Masegi et al. | ............ | 310/68 D |
| 6,430,024 B1* | 8/2002 | Gernert | ....................... | 361/302 |
| 6,587,330 B1* | 7/2003 | Sagal | .......................... | 361/511 |
| 6,664,674 B2* | 12/2003 | Ihata | ........................... | 310/64 |
| 6,731,030 B2* | 5/2004 | Keidar et al. | ............. | 310/68 D |

(Continued)

FOREIGN PATENT DOCUMENTS

JP   11102841 A *   4/1999

(Continued)

*Primary Examiner*—Darren Schuberg
*Assistant Examiner*—Pedro J. Cuevas
(74) *Attorney, Agent, or Firm*—Oliff & Berridge, PLC

(57) ABSTRACT

A generator for a vehicle includes a stator having an armature coil, a rotor having a field coil and a voltage regulator having a surge absorbing capacitor element and a heat sink. The heat sink dissipates heat that is transmitted to the capacitor element, so that temperature of the capacitor element can be kept low enough to prevent deterioration of the capacitor element.

6 Claims, 12 Drawing Sheets

U.S. PATENT DOCUMENTS

| | | | |
|---|---|---|---|
| 6,972,941 B2 * | 12/2005 | Miettinen et al. | 361/274.3 |
| 6,984,904 B2 * | 1/2006 | Kondo et al. | 310/68 D |
| 7,021,973 B2 * | 4/2006 | Morikaku et al. | 439/709 |
| 7,027,290 B1 * | 4/2006 | Thrap | 361/502 |
| 7,035,075 B2 * | 4/2006 | Miettinen et al. | 361/274.3 |
| 7,069,649 B2 * | 7/2006 | Tsunezaki et al. | 29/832 |
| 2001/0030472 A1 * | 10/2001 | Ihata | 310/64 |
| 2003/0042808 A1 * | 3/2003 | Keidar et al. | 310/68 D |
| 2006/0161359 A1 * | 7/2006 | Lalla | 702/65 |
| 2006/0266044 A1 * | 11/2006 | Donnelly et al. | 60/698 |
| 2006/0266255 A1 * | 11/2006 | Donnelly et al. | 105/61 |
| 2006/0266256 A1 * | 11/2006 | Donnelly et al. | 105/61 |
| 2006/0279902 A1 * | 12/2006 | Gallay et al. | 361/301.3 |

FOREIGN PATENT DOCUMENTS

| | | | |
|---|---|---|---|
| JP | A-2000-209824 | | 7/2000 |
| WO | WO 93/17439 | * | 4/2001 |

* cited by examiner

GENERATOR FOR VEHICLE

CROSS REFERENCE TO RELATED APPLICATION

The present application is based on and claims priority from Japanese Patent Application 2004-44396, filed Feb. 20, 2004, the contents of which are incorporated herein by reference.

BACKGROUND OF THE INVENTION

1. Field of the Invention

The present invention relates to a generator to be mounted in a vehicle and, more particularly, a voltage regulator with a surge absorbing capacitor element of such a generator.

2. Description of the Related Art

Usually, a generator mounted in a vehicle is composed of a stator core in which an armature coil is mounted, an engine-driven rotor in which a field coil is mounted, a rectifying unit which converts ac power generated by the armature coil to dc power, a voltage regulator which regulates output voltage of the generator, etc.

Such a regulator usually adopts a duty-ratio control system to control field current to be supplied to the field coil. In such a duty-ratio control system, electric surges are sometimes generated during switching operation. Such electric surges may cause harsh noise of audio devices and severe malfunction of other electronically controlled devices. In order to suppress such electric surges, a surge absorbing capacitor element has been introduced into the generator as disclosed in JP-A-2000-209824 or U.S. Pat. No. 6,236,557 B1, a counterpart of the former.

However, such a capacitor element is usually accommodated in a voltage regulator case, which is disposed near the rectifier unit. Therefore, the capacitor element is exposed to high temperature of the rectifier unit caused by switching and rectifying operation. In addition, the capacitor element is indirectly heated by the armature coil and the field coil in operation.

The capacitor element is mainly composed of an aluminum deposited polyester film, which may deteriorate if exposed to high temperature for a long time period. Although there is an idea of replacing the polyester film by a more heat-resistive film such as a polyphenilene sulfide film, this is too expensive.

SUMMARY OF THE INVENTION

In view of the above described problem, an object of the present invention is to provide a noise free and reliable generator for a vehicle that does not use an expensive noise suppressing capacitor.

Another object of the invention is to provide a noise-free voltage regulator equipped with a inexpensive heat resistive capacitor element.

According to a feature of the invention, a generator for a vehicle includes a stator having an armature coil, a rotor having a field coil that induces ac power in the armature coil when excited and a voltage regulator for regulating voltage of the ac power, wherein the voltage regulator comprises a surge absorbing capacitor element and a heat sink for dissipating heat that is transmitted to the capacitor element.

In the above described generator: the heat sink is disposed adjacent to a generator terminal or a terminal of the capacitor element; the heat sink may be integrated with the generator terminal or the terminal of the capacitor element; the capacitor element and the heat sink may be disposed in the case and covered with filling material; the voltage regulator may be disposed in the case together with the capacitor element and the heat sink; and the case may have a capacitor chamber for accommodating the capacitor element and a voltage regulator chamber for accommodating the voltage regulator.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A generator for a vehicle according to the first embodiment of the invention will be described with reference to FIGS. 1–6.

Figure 1:
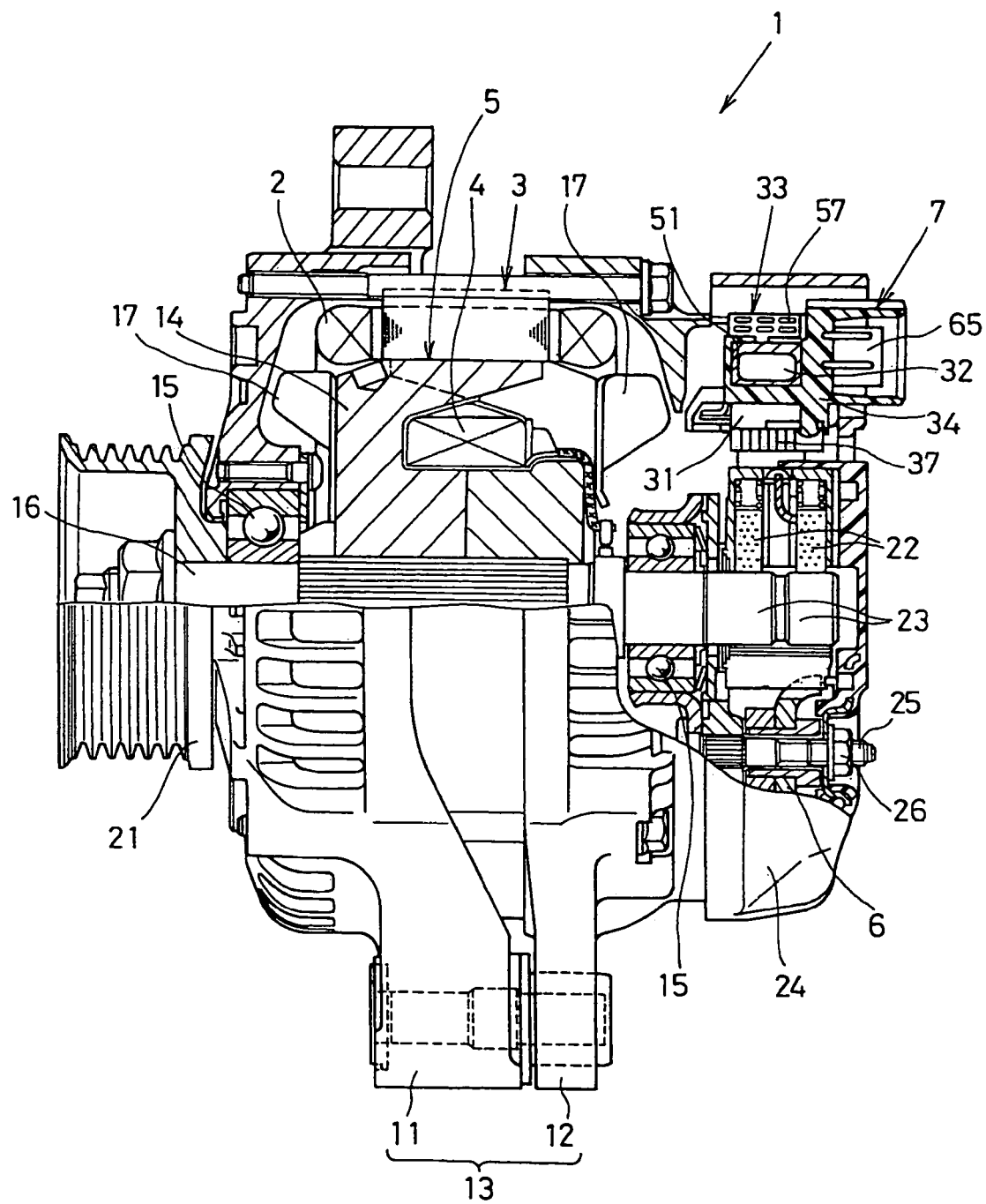
FIG. 1 is a cross-sectional side view of a generator for a vehicle according to the first embodiment of the invention.
Figure 2:
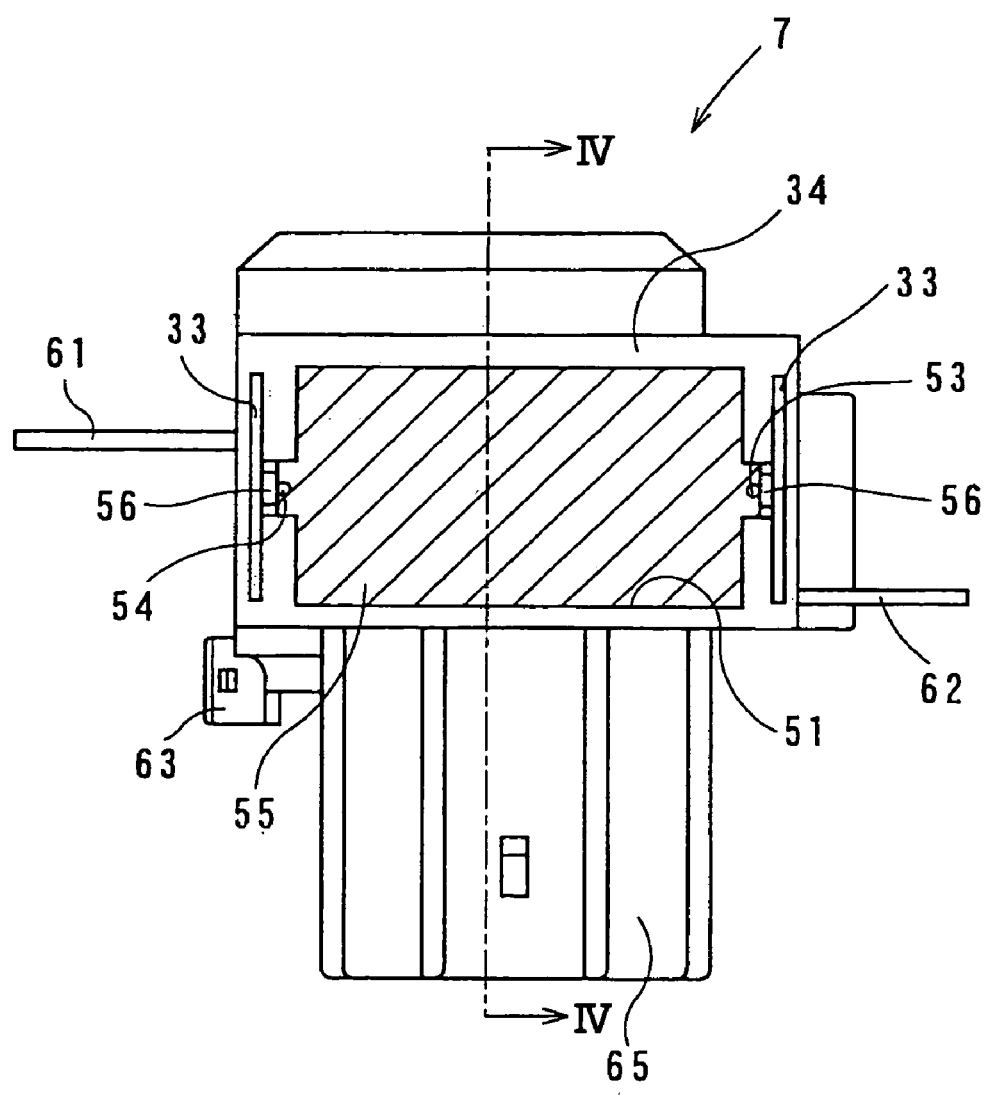
FIG. 2 is a schematic front view of a voltage regulator to be mounted in the generator shown in FIG. 1.
Figure 3:
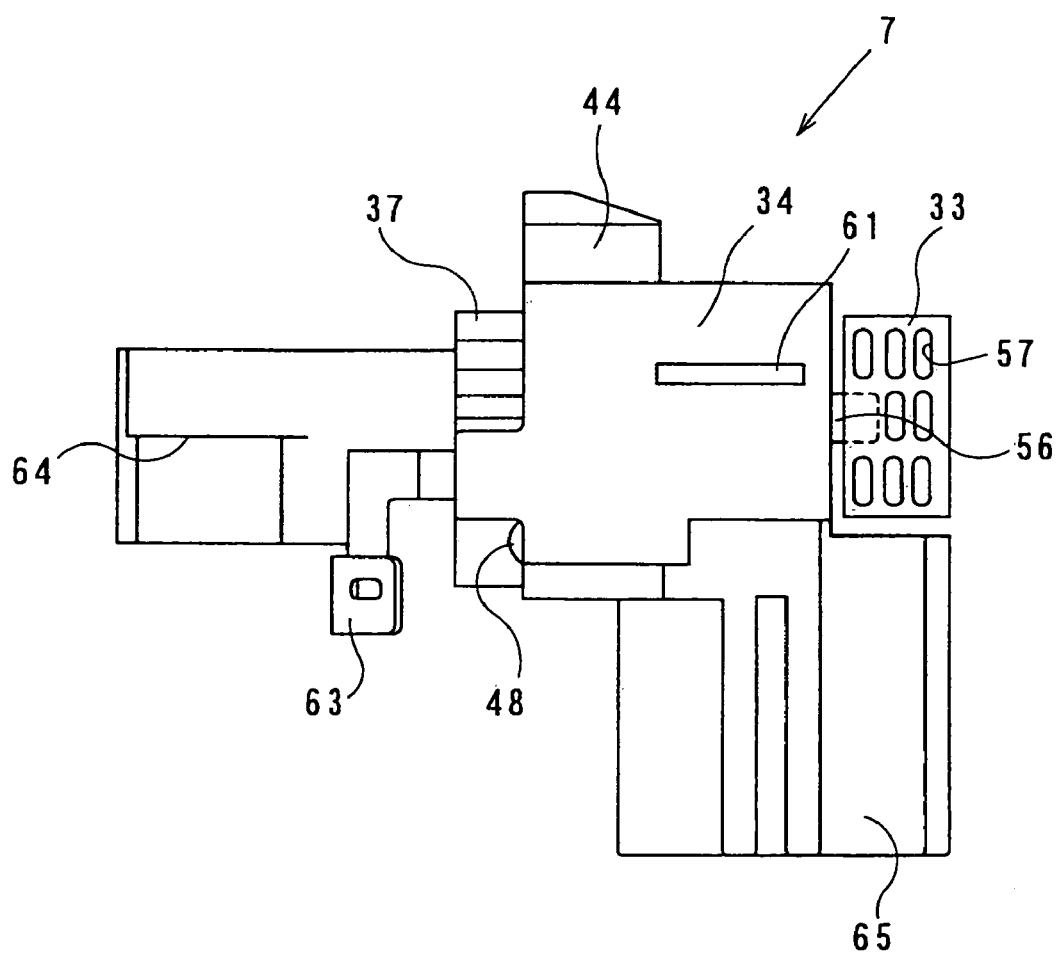
FIG. 3 is a schematic side view of the regulator shown in FIG. 2.

As shown in FIG. 1, the generator 1 includes an armature coil 2 that is mounted in a stator 3, a field coil 4 that is mounted in a rotor 5, a rectifier unit 6 that converts ac power generated in the armature coil 2 into dc power, a voltage regulator 7 that regulates the output voltage of the generator to be supplied to a battery and electric devices, etc.

The stator 3 and the rotor 5 are housed in a housing 13 that is composed of a front frame 11 and a rear frame 12. The stator 3 has a cylindrical body, which is fitted to the inside cylindrical wall of the housing 13, and the rotor 5 is disposed inside the stator 3 at a suitable air gap. The stator 3 has a plurality of axially extending slots to accommodate the armature coil 2 so as to form a three-phase stator winding.

The rotor 5 has a plurality of claw-shaped pole cores 14 and the field coil 4. The field coil 4 is wound around a rotary shaft 16 that is supported by a pair of bearings 15. One of the fans 17 is fixed to one axial end of the pole cores 14, and the other fan 17 is fixed to the other axial end of the pole cores 14. An end of the rotary shaft 16 projects from one axial end of the housing 13 to carry a pulley 21, and the other end carries a pair of slip rings 23, on which a pair of brushes is disposed to slide thereon. The rectifier unit 6 and the voltage regulator 7 are disposed at the other axial end of the housing 13 and covered by a rear cover 24.

The rear cover 24 is fixed to the housing 13 by a bolt 25 and a nut 26.

Figure 5:
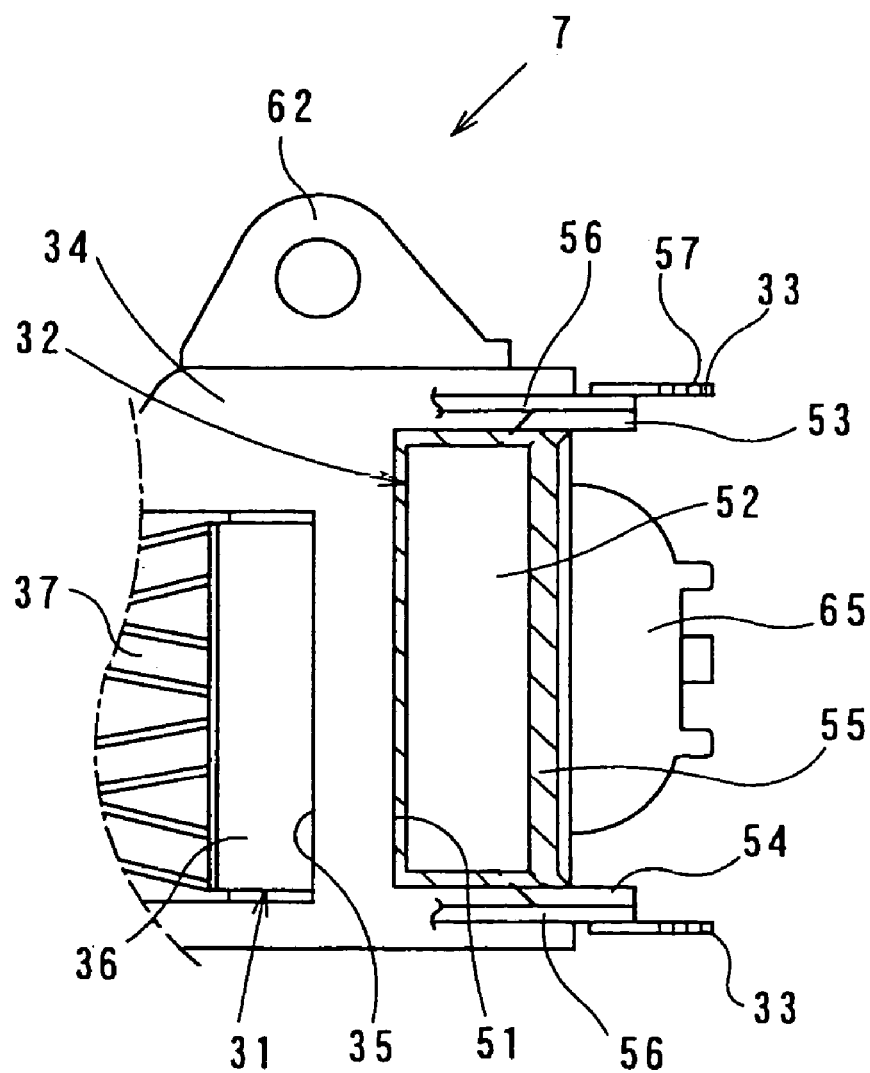
FIG. 5 is a schematic cross-sectional fragmental view of the regulator shown in FIG. 4 cut along line V—V.
Figure 6:
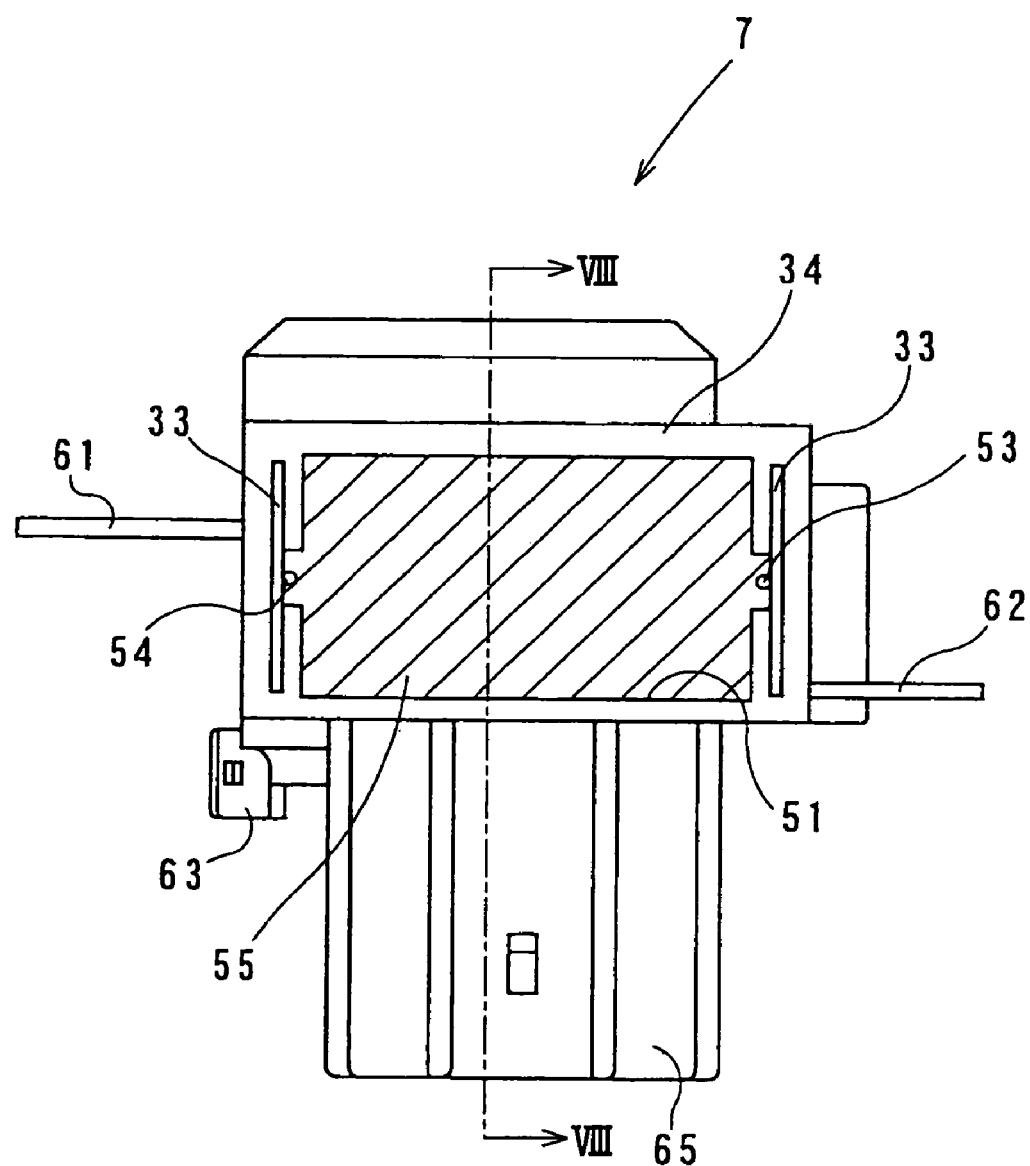
FIG. 6 is a schematic front view of a voltage regulator according to the second embodiment of the invention.
Figure 7:
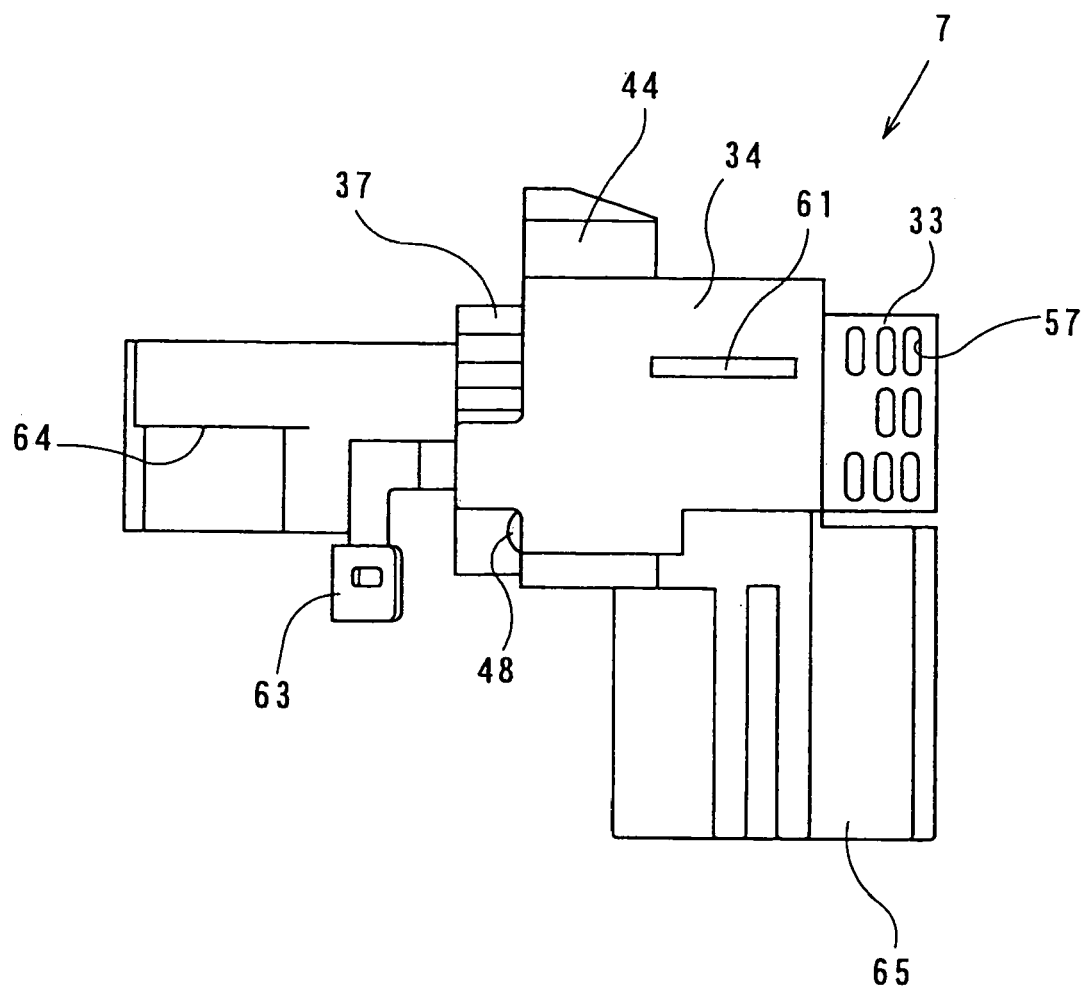
FIG. 7 is a side view of the voltage regulator according to the second embodiment.
Figure 8:
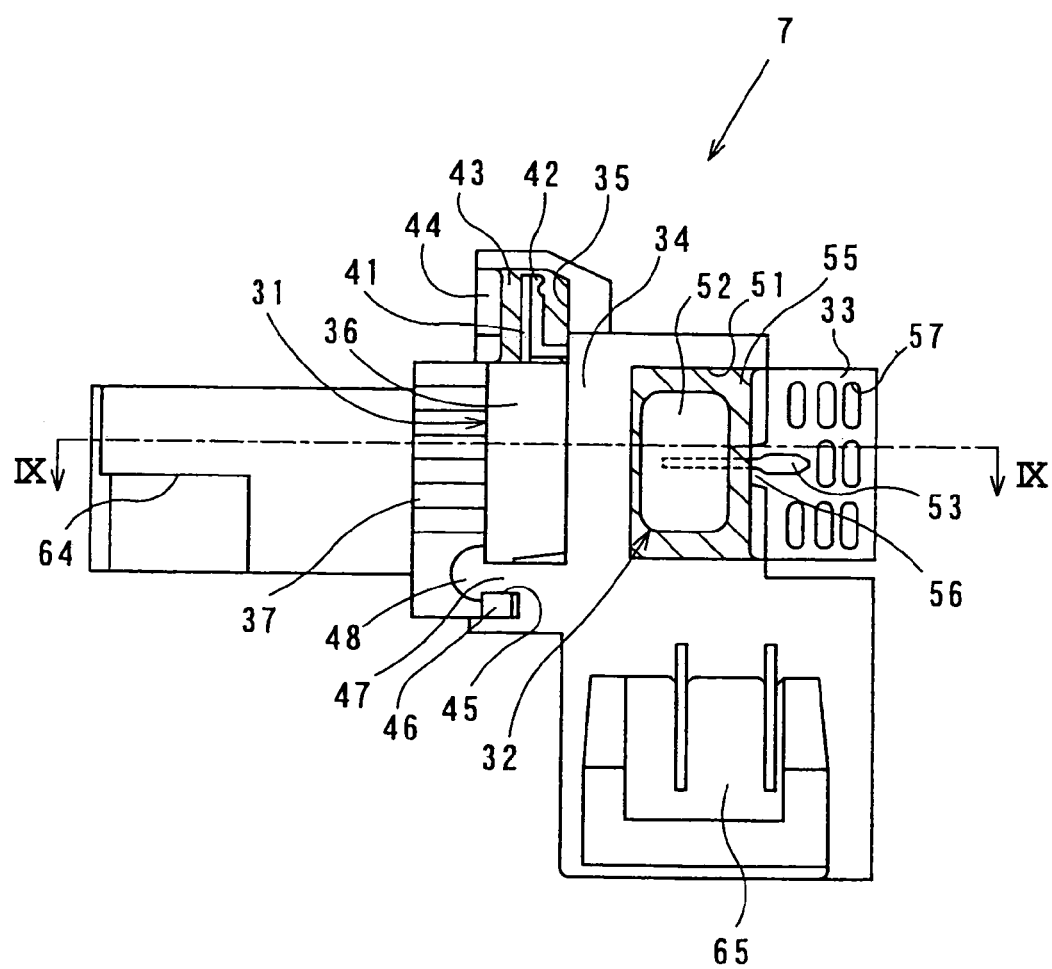
FIG. 8 is a cross-sectional view of the voltage regulator shown in FIG. 6 cut along line VIII—VIII.
Figure 9:
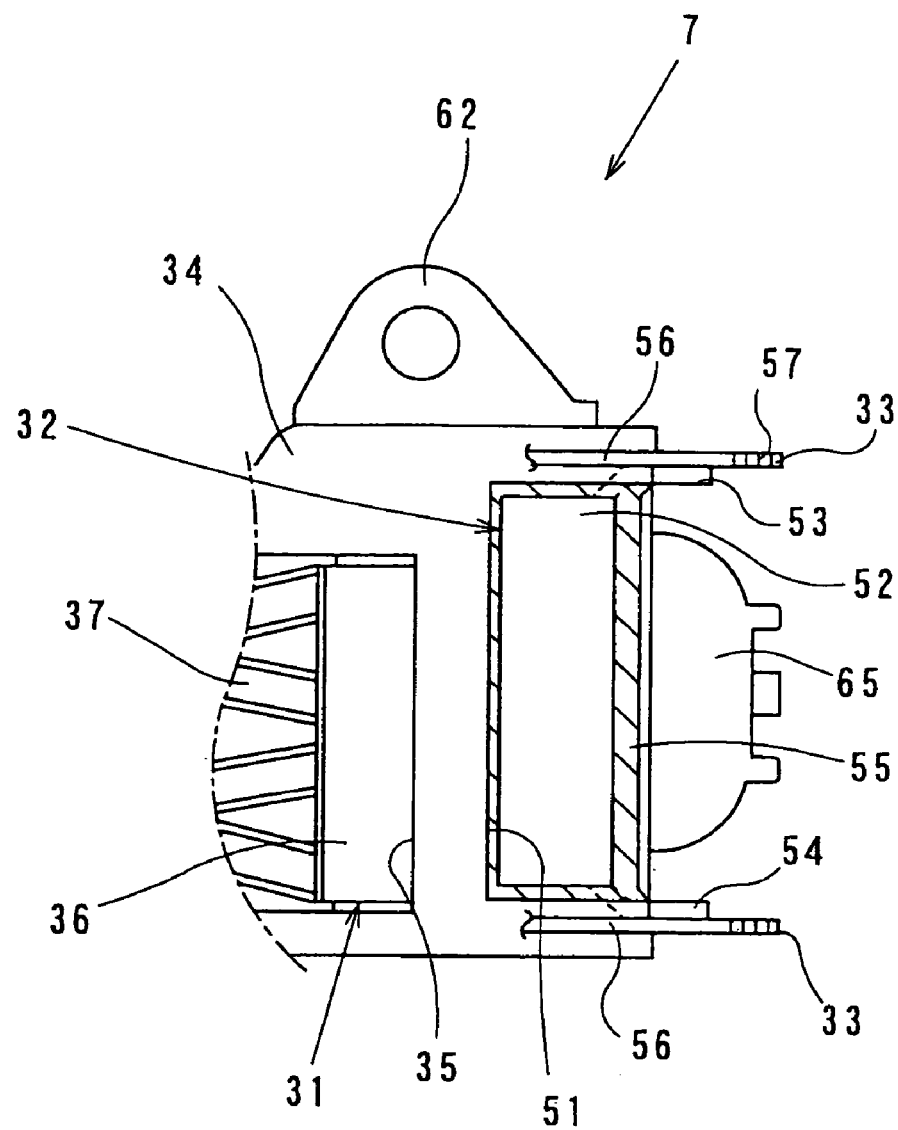
FIG. 9 is a cross-sectional view of the voltage regulator shown in FIG. 8 cut along line IX—IX.
Figure 10:
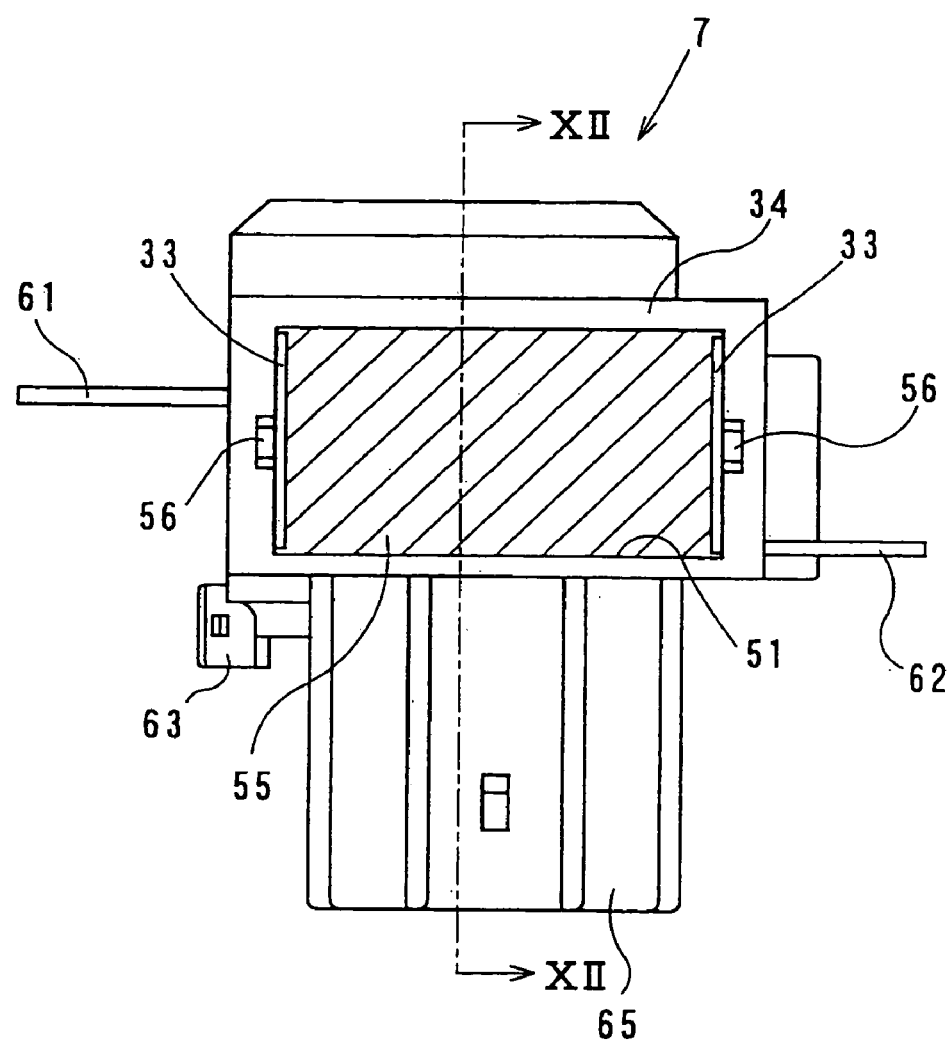
FIG. 10 is a schematic front view of a voltage regulator according to the third embodiment of the invention.
Figure 11:
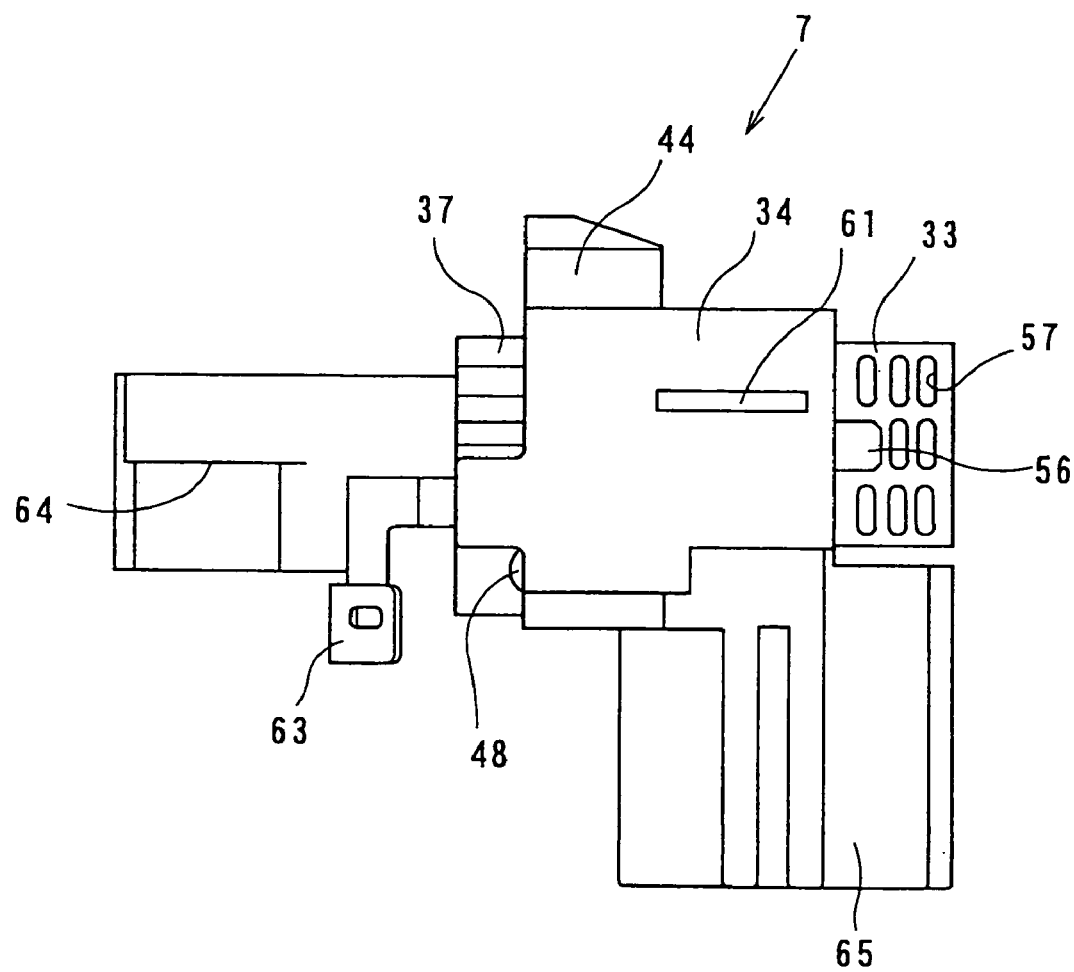
FIG. 11 is a schematic side view of the voltage regulator shown in FIG. 10.
Figure 12:
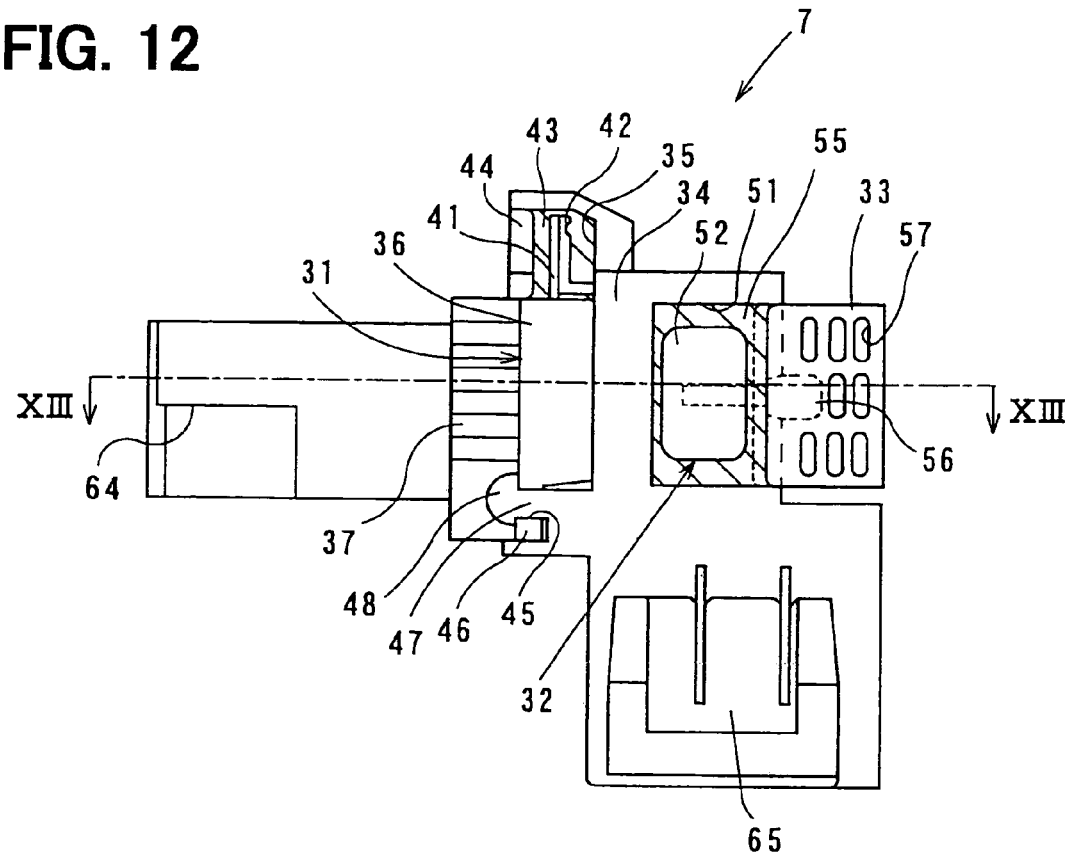
FIG. 12 is a cross-sectional view of the voltage regulator shown in FIG. 10 cut along line XII—XII.
Figure 13:
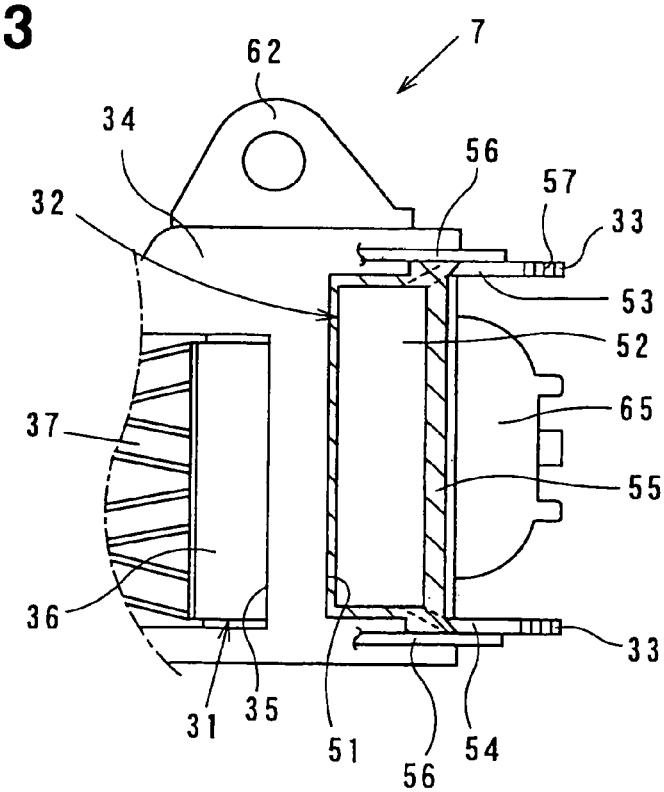
FIG. 13 is a cross-sectional view of the voltage regulator shown in FIG. 12 cut along line XIII—XIII.

As shown in FIG. 5, the voltage regulator 7 includes a voltage control unit 31, a surge absorbing capacitor element 32, a pair of heat sinks 33 and a regulator case 34. The regulator case 34 has a voltage regulator chamber 35 in which the voltage control unit 31 is accommodated.

Figure 4:
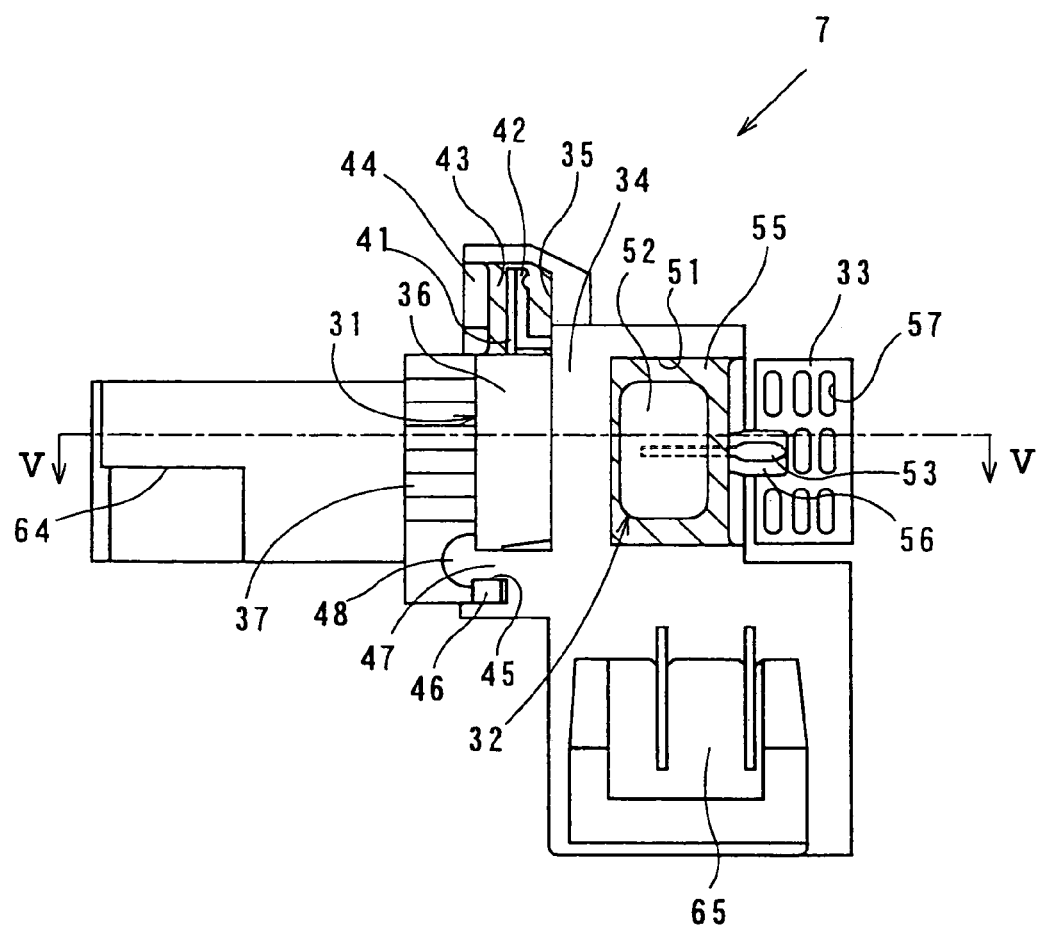
FIG. 4 is a schematic cross-sectional view of the regulator shown in FIG. 2 cut along line IV—IV.

As shown in FIG. 4, the voltage control unit 31 has a main body portion 36 that includes a control circuit for duty-control operation. The control circuit 31 is composed of a switching transistor for intermittently passing field current and a flywheel diode for passing field current when the switching transistor turns off. The main body portion 36 has a cooling fin 37, which dissipates heat transmitted from the switching transistor and the flywheel diode. A main body side electric terminal 41 projects from one end of the main body 36 and is connected to a case side electric terminal 42 that projects from the regulator case 34. The portions of the electric terminals 41, 42 connected to each other are covered with mold material 43 and a protection cover 44 and fixed to the regulator case 34. A fixing portion 45 that has a fixing hole 46 is formed at the other end of the main body 36. The case 34 has a projection 47, which is inserted into the fixing hole 46 and melted at its tip to form a head 48 whose diameter is larger than the fixing hole 46.

The regulator case 34 also has a capacitor element chamber 51. The capacitor element 32 has a cylindrical main body 52, a high voltage side terminal 53 that extends from one longitudinal end of the main body 52 and a low voltage side terminal 54 that extends from the other end in parallel to the former. The main body 52 of the capacitor element 32 is accommodated in the capacitor element chamber 51 and covered by filling material 55 to be completely buried therein. Both high voltage side and low voltage side terminals 53, 54 project from the filling material 55 into the rear cover 24, extend toward radially outer sides of the generator 1 and electrically connect to generator side terminals 56 that extend from the regulator case 34.

As shown in FIG. 5, the heat sinks 33 are respectively welded to, or fastened by fastening bolts to, the generator side terminals 56 on the side thereof opposite the side to which the low voltage side and high voltage side terminals 53, 54 are welded. The heat sinks 33 are disposed to be parallel with each other at an approximately the same distance as the high voltage and low voltage side terminals 53, 54. Therefore, the heat sinks 33 will not contact each other even if they are accidentally bent or deformed. The heat sinks 33 are disposed inside the rear cover 24 to be parallel with the rotary shaft 16 so as to extend in a radially outer direction of the generator 1. The heat of the heat sinks 33 is transmitted to air that is taken by the cooling fan 17 from air intake windows (not shown) formed in the rear cover 24 so as to flow along the surface of the heat sinks 33 in an axial direction of the generator. Each heat sink 33 has a plurality of press-formed vent holes 57 that form circumferential air flows to increase heat transmission from the heat sinks 33 to air. Thus, the temperature of the capacitor element 32 can be controlled to be low enough to prevent the capacitor material, such as polyester, from deteriorating.

As shown in FIG. 4, the case side electric terminal 42 projects into the regulator chamber 35, and the generator side terminal 56 projects outward from the from the capacitor element chamber 51, which is disposed inside the rear frame 12 and has an opening open radially outward from the generator 1. The voltage regulator case 34 also has an earth (i.e. E) terminal 61, a battery (i.e. B) terminal 62, an output voltage detecting (i.e. P) terminal 63, a field coil (i.e. F) terminal 64 and a connector 65. The connector 65 projects from the rear cover 24.

A voltage regulator according to the second embodiment of the invention will be described with reference to FIGS. 6–9. Incidentally, the same reference numeral as the first embodiment represents the same or substantially the same element, component or portion disclosed above.

As shown in FIGS. 6–9, the heat sinks 33 are respectively integrated with the generator side terminals 56. It is not necessary to fix the heat sinks 33 to the generator side terminals 56 after the capacitor element 32 is accommodated into the capacitor element chamber 51. In other words, assembling work can be made simpler.

A voltage regulator according to the third embodiment of the invention will be described with reference to FIGS. 10–13.

As shown in FIGS. 10–13, the heat sinks 33 are respectively integrated with the high voltage side and low voltage side terminals 53, 54 of the capacitor element 32, which are partly accommodated in the capacitor element chamber 51 and covered with the filling material 55.

As a variation: the capacitor element 32 may be accommodated in a case separate from the regulator case; the heat sink 33 may be fixed to separate members projecting from the main body 52; or a pair of the heat sinks 33 may be replaced by a single heat sink 33.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A generator for a vehicle comprising:
   a stator including an armature coil,
   a rotor including a field coil that induces ac power in the armature coil when excited,
   a cooling fan, fixed to the rotor, for providing cooling air, and
   a voltage regulator for regulating voltage of the ac power,
   wherein said voltage regulator comprises a voltage control unit having a cooling fin for dissipating heat of said voltage control unit, a case, a surge absorbing capacitor element disposed in said case and a heat sink for dissipating heat that is transmitted to the capacitor element, and said heat sink is disposed outside said case separately from said cooling fin of said voltage control unit to be in thermal contact with a portion of said capacitor element and exposed to cooling air taken by the cooling fan.

2. The generator as claimed in claim 1, further comprising a generator side terminal for supplying electric power,
   wherein said portion of said capacitor element comprises a capacitor terminal; and
   said heat sink is disposed adjacent to one of the generator side terminal and the capacitor terminal.

3. The generator as claimed in claim 2, wherein said heat sink is integrated with one of the generator side terminal and the capacitor terminal.

4. The generator as claimed in claim 1, wherein said capacitor element is covered with filling material.

5. The generator as claimed in claim 4, wherein said voltage control unit is disposed in said case together with said capacitor element.

6. The generator as claimed in claim 5, wherein said case has a first chamber for accommodating said capacitor element and a second chamber for accommodating said voltage control unit.

* * * * *